Nov. 1, 1955     H. H. TALBOT     2,722,392
CONNECTING ELEMENTS FOR A BASE AND PLATFORM
Filed April 2, 1949
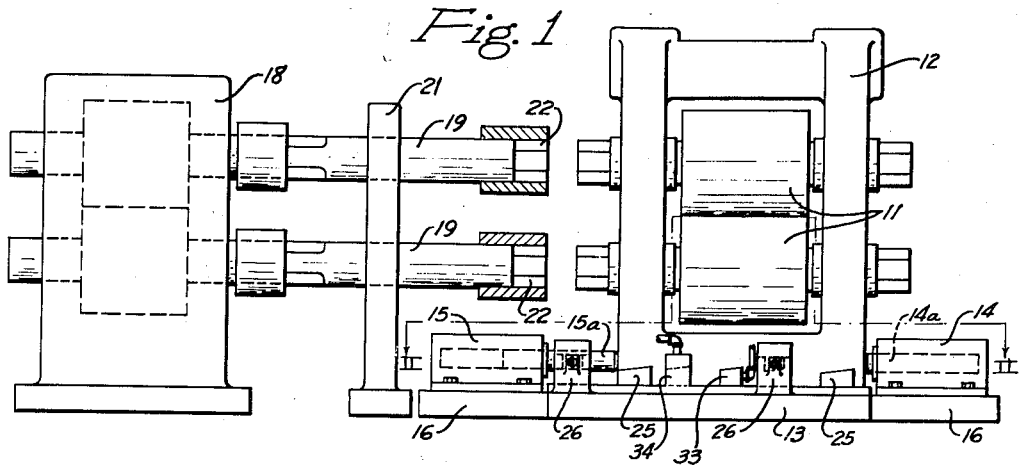
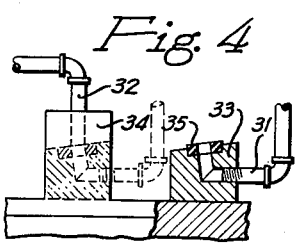
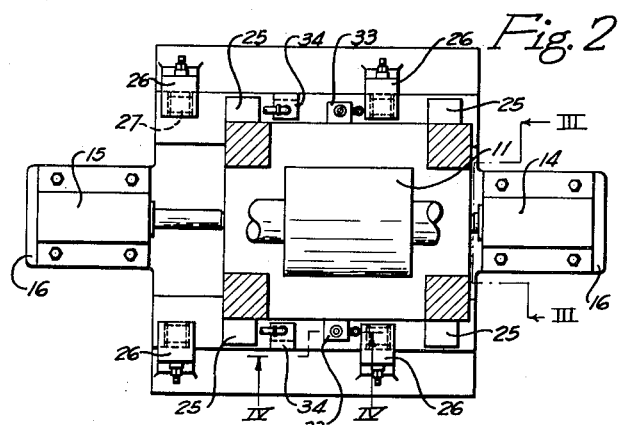
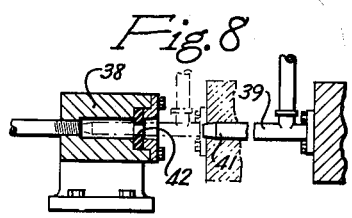
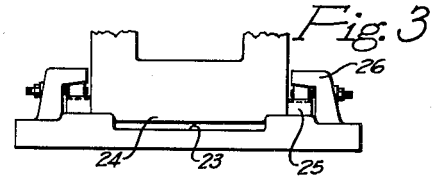
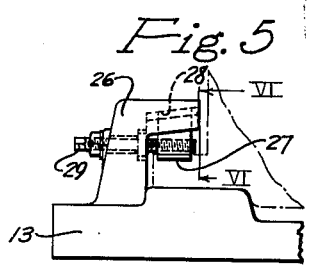
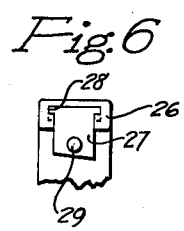
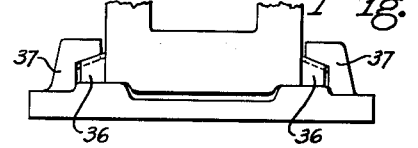
INVENTOR.
HOWARD H. TALBOT
BY

United States Patent Office 2,722,392
Patented Nov. 1, 1955

2,722,392

CONNECTING ELEMENTS FOR A BASE AND PLATFORM

Howard H. Talbot, Pittsburgh, Pa., assignor to United Engineering & Foundry Company, Pittsburgh, Pa., a corporation of Pennsylvania Application April 2, 1949, Serial No. 85,183

6 Claims. (Cl. 248—19)

This invention relates to metal rolling mills and, in particular, to merchant mills and the like in which a quick section change is desirable, involving the removal of one or more operating stands and the replacement thereof with similar ones which have been pre-assembled.

In present day rolling mill practice when the necessity arises for changing the rolls of a mill, considerable "down time" results by reason of the tedious operations required in effecting the removal of the rolls and the replacement thereof. When it becomes necessary to remove a mill from the line for servicing or replacement much effort is expended inasmuch as the fastening devices employed for securing the mill to its bedplate or platform, as well as the various connections for the water, oil and grease lines, all require individual attention.

This invention, by reason of its simplicity, permits an operating schedule in which interruption thereof is considerably reduced whether a mill requires a change of rolls or servicing in general. In either case, in order to avoid interruption with the operation of a line, a standby mill, for example, can be provided which is completely fitted and in order so that it may be immediately inserted into the operating position in the line and firmly secured to the bedplate or platform as soon as removal of the mill to be replaced has been effected.

Among the various objects of this invention is to provide a merchant mill or the like adapted to be placed rapidly in the operating position, to provide a platform or bedplate having a releasable means associated therewith for securing thereto, for example, a pre-assembled merchant mill, and to provide apparatus for facilitating the removal and replacement of an operating mill including the making of the various connections to the water, oil, and grease lines whereby a minimum of time and effort is required.

These objects, as well as the various other novel features and advantages of this invention, will become apparent from the following description and accompanying drawings of which, Figure 1 is a side elevation of a rolling mill together with the platform upon which the mill is adapted to be shifted and secured, and the pinion stand and driving spindles with which the mill is associated, Figure 2 is a sectional view taken at II—II of Figure 1, Figure 3 is a partial end view of the mill housing and platform taken at III—III of Figure 2, Figure 4 is an enlarged sectional view of a pair of the locking elements taken at IV—IV of Figure 2, showing the hydraulic connections terminating therein, Figure 5 is an enlarged view of a pair of the elements for securing the housing to the platform, Figure 6 is a view taken at VI—VI of Figure 5, Figure 7 is a partial end view, similar to Figure 3 but of a modified housing and platform, and Figure 8 is a modified hydraulic coupling.

With reference to the drawings, particularly Figures 1 and 2, there is shown a two-high rolling mill comprising a pair of rolls 11, mounted within a housing 12 which is shown positioned on and adapted to be secured to a platform or bedplate 13. For moving the mill into and out of the driving position, two hydraulic motors 14 and 15, secured to extensions 16 of the platform 13 and having pistons 14a and 15a which make contact with the sides of the mill housing 12, are connected to a source of hydraulic power, which, since it may be of any suitable type well known in the art, is not specifically shown and described herein. A pinion stand 18, for driving the rolls 11, is connected to a suitable source of power and is provided with a pair of spindles 19 mounted in a carrier 21. A pair of sleeves 22, mounted on the ends of the spindles, are so formed as to accommodate the ends of the rolls when the mill is moved to and secured in the operating position.

The platform 13, as shown in Figure 3, has a depression 23 at the top thereof within which the lower portion 24 of the housing is received and, by reason of the very close fit of the two, an adequate guide is thus provided for directing the movement of the mill stand into and out of driving engagement with the spindles 18. Integral with the mill housing 12 are four accurately machined shallow tapered projections 25 adapted to be received within slotted elements 26 which extend vertically upward from the platform 13. Tapered T-shaped fit adjustment wedges 27, slidably positioned within inclined slots 28, are threadably secured to rotatable shouldered screw shafts 29 extending through the vertical elements 26 and secured in elongated clearance holes which permit movement vertically of the shafts when the wedges are caused to slide along the inclined slots 28. By initial adjustment setting of these wedges proper contacts with the housing projections are assured. On opposite sides of the mill and adjacent to the interengaging fit adjustment assemblies, there are shown in Figure 4 hydraulic connections 31 and 32, connection 31 terminating in a projection 33 of the roll housing 12 and the other connection 32 terminating in an element 34 affixed to the platform 13. A resilient sealing element 35 eliminates leakage at the joint when the stand is in the operating position and passages of elements 33 and 34 are aligned and in communication with one another as indicated in dot and dash lines in Figure 4. The fittings are adapted to be used for connecting oil, grease, or water lines and, though but two sets are described and illustrated, any number of connections may be similarly fitted to the mill housing and platform.

For removing the mill to effect a roll change or otherwise to perform a reconditioning or servicing thereof, it is simply necessary to relieve the fluid pressure in the hydraulic motor 14, since during operation the mill is maintained in position by constant pressure applied to the motor 14, admit fluid under pressure to the hydraulic motor 15 so that the piston rod 15a thereof is extended to make contact with and move the mill to the position shown in Figure 1, thereby disconnecting the gripping elements 25 and 26, the driving spindles and all oil, grease, and water lines. By means of a crane, the entire mill is lifted off the platform, a pre-assembled mill substituted therefor, and by actuation of the hydraulic motor 14, the new mill urged into its operating position. Thus by this inverse operation housing projections 25 are moved into firm engagement with wedge elements 27, thus securing the stand to the platform 13. The driving spindles, previously having been lined up with the ends of the mill rolls, are engaged and the various water, grease, and oil lines connected as the mill stand moves into its operating position.

According to one of the modifications of this invention, as shown in Figure 7, the projections 36 of the mill housing are tapered both longitudinally and laterally thereby to match the similarly tapered elements 37 secured to the platform thus to provide for quick and accurate centering of the mill. It will be satisfactory for the under portion of the base to be rough machined only, in this instance, as the projections themselves provide the necessary centering means.

A modified fluid coupling, as shown in Figure 8, consists of a female member 38 affixed to the platform and a male member 39 secured to the side of the housing. When the mill is placed in the operating position the members 38 and 39 are connected by passing the shank 41 of member 39 through the opening in the resilient packing element 42 thereby sealing the coupled members as indicated in dot and dash lines in Figure 8.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A connection between a base and platform comprising a base having a projection at the lower portion thereof, a platform having a depression therein within which there is received for guided movement the projection of said base, tongued elements integral with and extending laterally outwardly from said base, grooved elements integral with and extending laterally inwardly from said platform, the grooves of said elements extending in an inward upward direction, means adjacent to and for shifting said base relative to said platform for placing said tongued elements within said grooved elements, and laterally outwardly adjustable wedging means secured within the grooved elements for engaging with and preventing relative movement between said tongued and grooved elements.

2. A connection between a base and platform comprising a base, a platform, a plurality of laterally outward projecting elements secured to said base, a plurality of upwardly and laterally inwardly extending slotted members secured to said platform, means adjacent to and for moving said base relative to said platform whereby to place said elements adjacent to said members, and laterally adjustable wedging means slidably secured within the slots of said members and movable outwardly firmly to engage said grooved members and said projecting elements thereby to prevent relative movement therebetween.

3. A connection between a base and a platform comprising a base, a platform, a guide within said platform adapted to receive said base for restricted movement therein, a plurality of projections extending laterally outwardly from said base, a plurality of laterally inwardly extending members each having a slot therein extending in an upward inward direction, means for shifting said base relative to said platform whereby to place said elements adjacent to said members and laterally adjustable wedging means slidably secured within the slots of said member and movable outwardly firmly to engage said slotted members and said projecting elements thereby to prevent relative movement therebetween.

4. A connection between a base and a platform comprising a base, a platform, a plurality of lugs laterally outwardly projecting from said base, said lugs being tapered in both a longitudinal and a lateral direction with respect to said base, laterally inwardly extending hook-shaped members secured to said platform and being internally tapered in an inward upward direction, means for shifting said base relative to said platform to place said lugs adjacent to said members, laterally adjustable wedging means tapered at the lower surfaces thereof in both a longitudinal and lateral direction and slidably secured to said members and means secured to said members for moving said wedging means in an outward direction to engage said members and said lugs thereby to prevent relative movement therebetween.

5. A connection between a base and a platform comprising a base, a platform, a plurality of lugs extending outwardly from said base, inwardly extending receptacles tapered inwardly in a downward and outward direction secured to said platform for receiving said lugs, wedging means secured to and slidable along the tapered surface of said receptacles, means adapted to engage with and shift said base relative to said platform to place said lugs within said receptacles, and means secured to said wedging means for moving said wedging means outwardly firmly to engage said lugs and said receptacles thereby to prevent relative movement therebetween.

6. A connection between a base and a platform comprising a base, a platform, a plurality of members extending laterally outward from said base, at least one of said members having a passageway therethrough, a plurality of receptacles secured to said platform for receiving and firmly seating said members, at least one of said receptacles having a passage therethrough, laterally slidably adjustable wedging means within said receptacles in which there are no passages, means for engaging with and shifting said base relative to said platform for placing said members within said receptacles and joining together said passageways within said member and said receptacle, and means secured to said wedging means for moving said wedging means outwardly firmly to engage said members and said receptacles thereby to prevent relative movement therebetween.

References Cited in the file of this patent

UNITED STATES PATENTS

| Re. 19,448 | Johnson | Feb. 5, 1935 |
| 287,008 | Daniels | Oct. 23, 1883 |
| 912,760 | Voegeli et al. | Feb. 16, 1909 |
| 1,609,939 | Gehrung | Dec. 7, 1926 |
| 1,699,636 | Smith | Jan. 22, 1929 |
| 1,954,242 | Heppenstall | Apr. 10, 1934 |
| 1,957,472 | Pankratz | May 8, 1934 |
| 2,373,341 | Rowe | Apr. 10, 1945 |
| 2,418,332 | Burrows | Apr. 1, 1947 |

FOREIGN PATENTS

| 43,741 | Denmark | Feb. 23, 1931 |
| 575,486 | Germany | Apr. 28, 1933 |